April 28, 1964 R. W. MOHR 3,130,759
TOOL ATTACHMENT FOR PORTABLE POWER UNIT
Filed Dec. 1, 1960 3 Sheets-Sheet 1
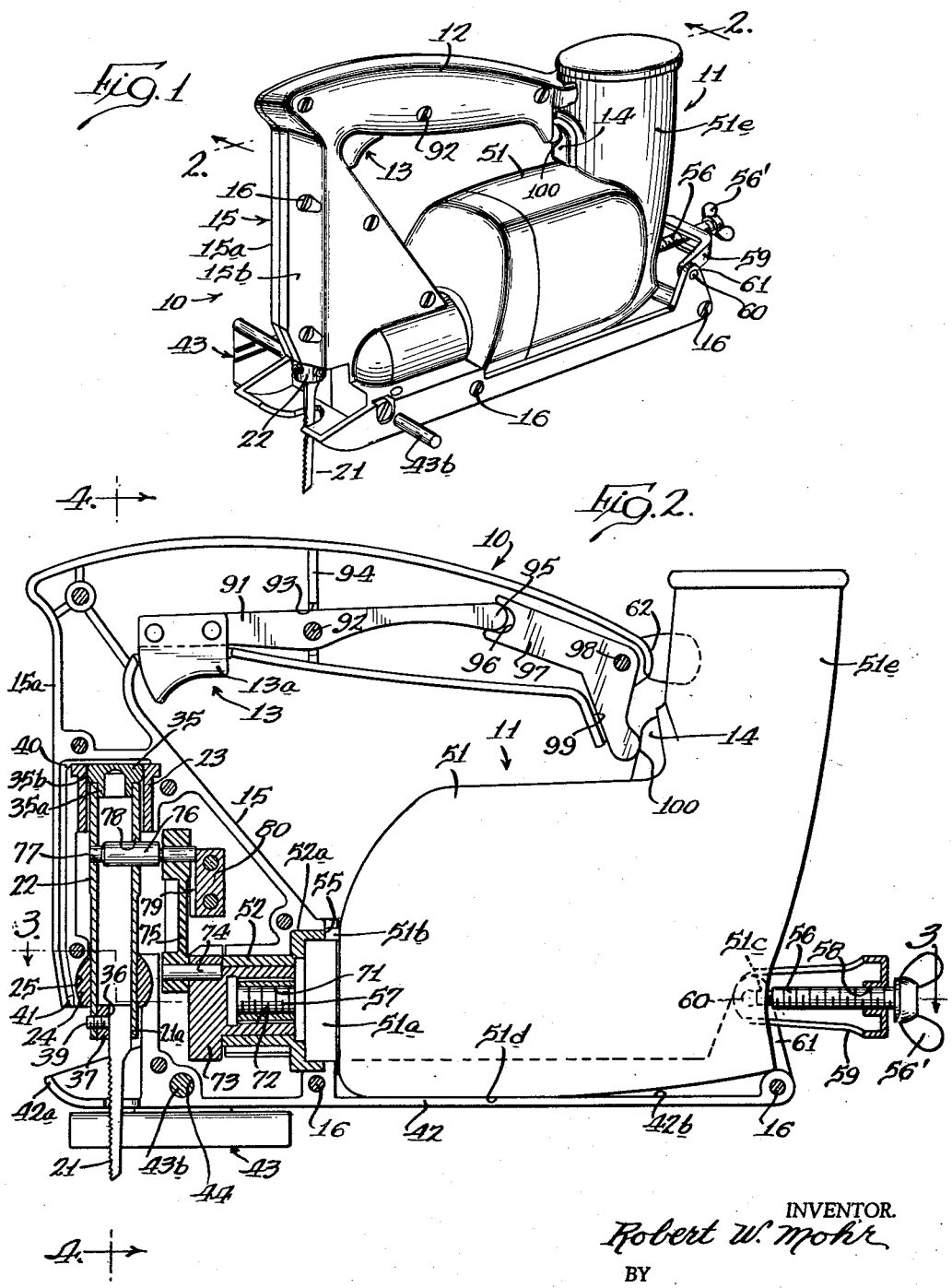
INVENTOR.
Robert W. Mohr
BY
George R. Clark
Atty.

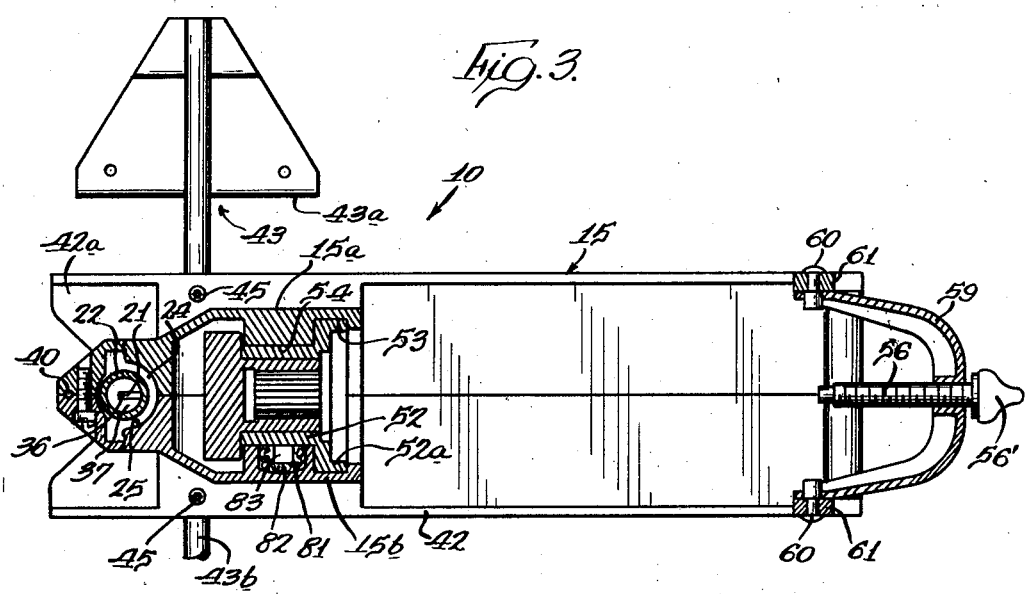
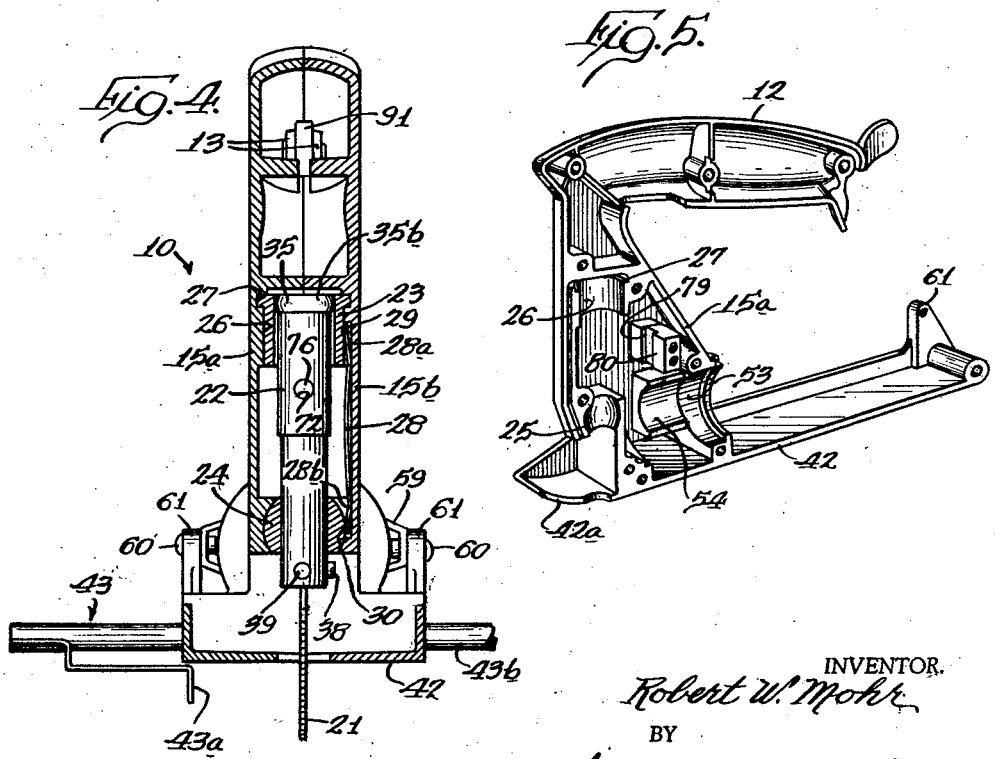

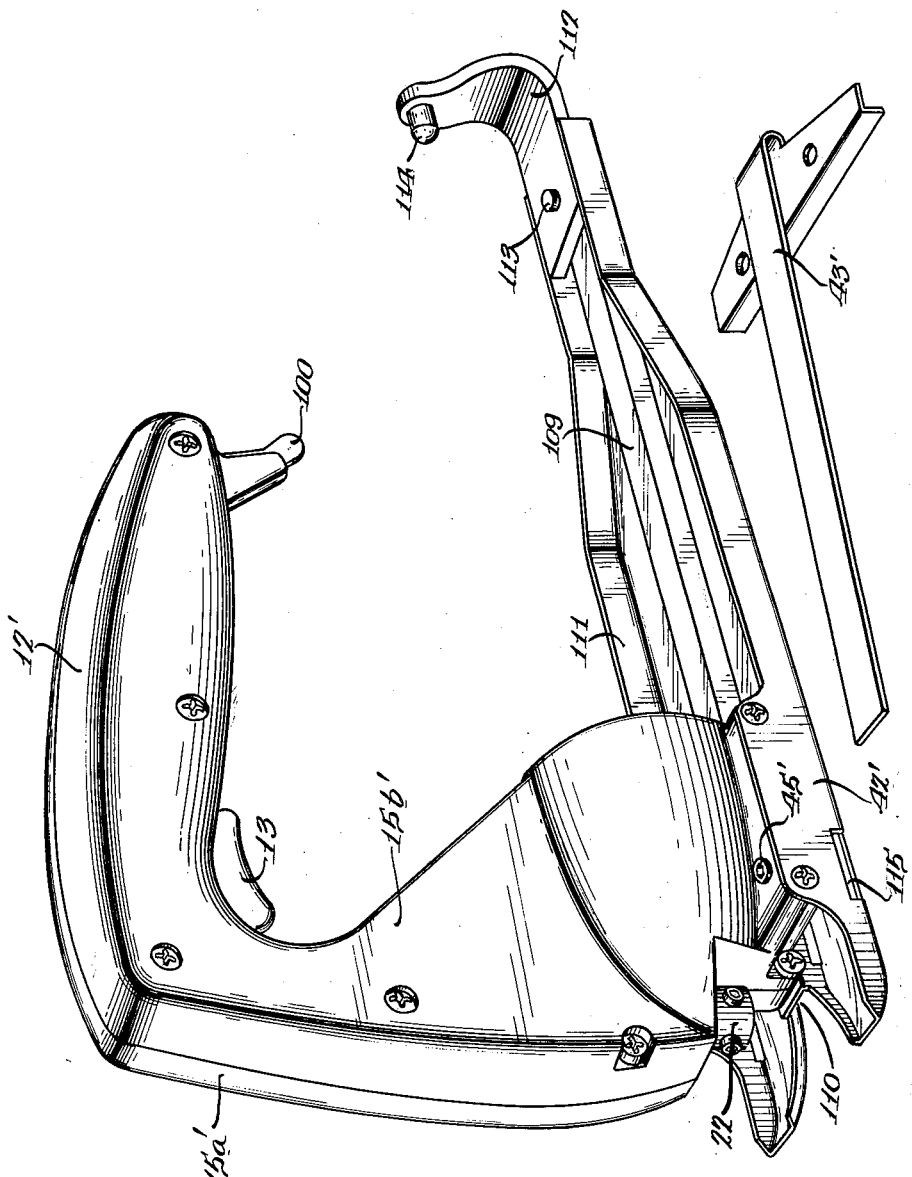

United States Patent Office 3,130,759
Patented Apr. 28, 1964

3,130,759
TOOL ATTACHMENT FOR PORTABLE
POWER UNIT
Robert W. Mohr, Geneva, Switzerland, assignor to Sunbeam Corporation, Chicago, Ill., a corporation of Illinois
Filed Dec. 1, 1960, Ser. No. 73,108
15 Claims. (Cl. 144—35)

This invention relates to a tool attachment for a portable power unit, and more particularly to a jig saw attachment for a portable drill.

Jig saw attachments for portable drills have been known hitherto. Such an attachment customarily includes a frame mounting a blade reciprocating slide along with a mechanism for converting rotary motion of the drill to reciprocating motion of the slide and structure for securing the drill housing to the frame so that the handle of the drill may be used to manipulate the assemblage. In most attachments of this type, the drill extends generally perpendicular to the direction in which the blade extends with the handle of the drill positioned parallel to the blade. This arrangement is ideal for purposes of providing a simple mechanism for converting the rotary motion of the drill spindle into reciprocating motion of the blade, but the handle is positioned too far to the rear of the blade for convenience in manipulating the assemblage. There have been attempts in the prior art to solve this problem by mounting the drill above the attachment in longitudinal alignment with the blade. In such devices, however, the assemblage is top heavy and the handle of the drill is too far above the attachment for convenient manipulation. Also, the motion converting mechanisms are more complicated and less satisfactory. It would be desirable to provide a combined jig saw attachment and portable drill in which there is a manipulating handle at a position near to the blade reciprocating mechanism and with the drill extending perpendicularly to the mechanism so that the center of gravity of the assemblage is low. It also would be desirable in such an attachment to have a drill switch actuating mechanism located at a convenient point in the assemblage.

It is accordingly an object of the invention to provide a unit and improved tool attachment for a portable power unit.

Another object of the invention is to provide a new and improved jig saw attachment for a portable drill.

Still another object of the invention is to provide a jig saw attachment for a portable drill in which the drill is mounted perpendicularly relative to the blade reciprocating mechanism of the attachment and a handle is provided near the blade reciprocating mechanism. The attachment also may be provided with a device for actuating the switch of the drill.

Yet another object of the invention is to provide a jig saw attachment for a portable drill in which there is provided a combined guide shoe and cradle for supporting the drill along with structure for rigidly locking the drill in the cradle.

Other objects of the invention will be apparent from the following detailed description of a jig saw attachment for a portable drill forming a specific embodiment thereof, when read in conjunction with the appended drawings, in which:

FIG. 1 is a perspective view of a jig saw attachment for a portable drill forming one embodiment of the invention;

FIG. 2 is an enlarged vertical section of the attachment taken along the line 2—2 of FIG. 1;

FIG. 3 is a horizontal section of the attachment taken along the line 3—3 of FIG. 2;

FIG. 4 is a vertical section of the attachment taken along line 4—4 of FIG. 2;

FIG. 5 is a perspective view of a portion of the frame of the attachment; and

FIG. 6 is a perspective view of a second form of the invention.

The preferred form of the invention provides a tool attachment for a portable power unit such as an electric drill in which the attachment has a guide shoe portion on which the portable power unit is cradled. The attachment is provided with a jig saw blade reciprocating mechanism and a handle extending parallel to the guide shoe portion and supporting a trigger device for actuating the switch of the drill. A clamping member is provided at the rear of the guide shoe portion for pressing the drill forwardly into a keying socket to locate the drill in a position drivingly connected to a mechanism for converting rotary motion of the drill to reciprocating motion of the blade.

Referring now to FIGS. 1 to 5 of the drawings, there is shown a jig saw attachment 10 and a portable drill 11 of known pistol-type construction. The attachment cradles the drill so that the drill is supported by the attachment, and has a conveniently located handle 12 which supports a trigger mechanism 13 in a convenient location for actuating a switch trigger 14 of the drill. The attachment has a housing or frame 15 which is generally U-shaped and longitudinally split and consists of cast sections or halves 15a and 15b secured together by cap screws 16.

A jig saw blade 21 is reciprocated by a reciprocable tubular slide 22, which also serves as an air pump to supply jets of air to work being sawed. To guide the slide 22, there is provided an elongated, flanged bushing 23 and a self-aligning, spherical bearing 24. The bearing 24 is seated for universal movement in a spherical socket or bearing seat 25 formed in the frame 15. The bushing 23 is mounted in a vertical bore 26 (FIG. 4) in the frame 15 with the flange of the bushing fitting into a groove 27 in the frame to hold the bushing against longitudinal movement relative to the frame. The bushing 23 and bearing 24 may be loosely fitted in their respective retaining structures, and are retained tightly therein by a leaf spring 28 (FIG. 4) having end portions 28a and 28b projecting into grooves 29 and 30, respectively, formed in the frame section 15b and bearing against the bushing 23 and bearing 24 to firmly seat these elements.

The slide 22 fits closely but slidably in the bearing 24, but is loose in the bushing 23. To guide the slide in the bushing 23, a cap or piston 35 is provided. The cap 35 has a shank portion 35a force fitted into the upper end of the slide 22, and a head portion 35b slightly rounded at its periphery to provide self-alignment in the bushing 23 and fitting closely but slidably in the bushing. The blade 21 has a flat shank portion 21a (FIG. 2) fitting into a slot 36 in a plug 37 fitted in the lower end of the slide 22 and secured by a set screw 38 (FIG. 4) in the slide. A set screw 39 locks the blade to the plug and also holds the plug in the slide 22.

To blow sawdust from the upper surface of the work, the cap 35 acts as a piston and the bushing 23 as a cylinder, and, on each upward stroke of the slide 22, air under pressure is forced through a passage 40 formed in the frame 15 at its parting line. The air travels from the start of the passage at the upper end of the bushing 23 downwardly and out through a nozzle of orifice 41 formed in the frame. The nozzle is directed at the work between curved forward portions 42a of a guide shoe 42 of the frame and blows sawdust from the work.

The guide shoe 42 of the frame 15 is provided for supporting the attachment on the work during operation of the attachment and also to support or cradle the drill 11. A rip guide 43 having a shoe 43a and a rod 43b provided with calibrated markings if desired is provided to guide the attachment during ripping. The rod is slidable in a bore 44 (FIG. 2), and set screws 45 serve to fix the rod against movement when it has been adjusted.

The guide shoe 42 projects to the rear of the blade to provide a cradle portion 42b to receive the drill 11 in inverted position. The drill is supported in a position in which a generally cylindrical spindle bearing housing portion 51a of drill housing 51 nests in an enlarged cup or socket portion 52a of a bushing 52. The bushing 52 is secured in the frame 15 as best shown in FIGS. 2 and 3 with the portion 52a fitting into an annular groove 53 and the shank portion of the bushing fitting into a bore 54 in the frame 15. The frame 15 has a notch or slot 55 into which a radial lug 51b of the drill housing 51 fits to key the drill housing to the frame 15. To lock the drill in this position, a pressing screw 56 is adapted to enter a socket 51c in the rear of housing 51 and press the drill toward the left, as viewed in FIG. 2. The socket 51c is aligned with spindle 57 of the drill with the upper (now inverted) edge 51d of the drill parallel thereto. The screw 56 has a wing portion 56' and is threaded in tapped bore 58 in a rigid U-shaped strap 59. The strap 59 is hinged by rivets 60 to upstanding arms 61 of the frame 15. To assist the lug 51b in keying the drill housing 51 to the frame 15, the handle 51e of the drill housing fits into a notch 62 at the rear of the attachment handle.

A splining nut 71 is adapted to be threaded on the spindle 57 and fits into a splined socket 72 formed in a crank 73. The crank socket 72 is journalled in the bushing 52, and has an eccentrically located crank pin 74 connected to a connecting rod 75. A stepped pin 76 projecting through bores 77 and 78 in the slide 22 is mounted on the upper portion of the connecting rod 75, and extends into a vertical guideway 79 formed in a guide block 80. The block 80 is mounted on two screws between the hollow frame halves 15a and 15b. When the drill is operated, it rotates the crank 73, which reciprocates the slide 22. A pocket 81 is formed in the frame 15 which holds a rubber or other suitable pressure plug 82. A projection 83 on the bushing 52 keys the bushing 52 to the farme 15. The projection 83 is received by the plug 82 and the plug urges bushing 52 against the opposite side of the housing. This, similar to spring 28 permits wide casting tolerances without chattering during operation.

For the purpose of conveniently actuating the switch trigger 14 of the drill 11, the trigger mechanism 13 has a trigger 13a at the forward end of the handle 12. The trigger 13a is riveted to a lever 91 mounted pivotally on securing screw 92 with a clearance slot 93 being provided in a strut member 94 of the frame 15. A rounded end 95 of the lever 91 fits loosely in a curved socket 96 in a lever 97 to connect these levers pivotally together. The lever 97 is mounted pivotally on a securing screw 98 and one end of the lever 97 projects through an opening 99 in the rear end of the handle. The lever 97 has a rounded end or lobe portion 100 for slidably engaging the switch trigger 14 of the drill 11. To turn on the drill 11, and therefore the jig saw also, a user grasping the handle 12 presses the trigger 13a to pivot lever 91 in a clockwise direction, as viewed in FIG. 2. The lever 91 swings the lever 97 in a counterclockwise direction to force the switch trigger 14 to the right against the action of a spring (not shown) in the drill which urges the switch trigger 14 constantly toward the left. This movement of the switch trigger 14 of the drill closes switch means (not shown) of known construction in the drill housing 51 to start the electric motor in the drill and drive the blade 21 from the drill spindle 57. When the trigger 13a is released by the user, the spring biased switch trigger 14 moves to the left to open the drill switch and move the levers 97 and 91 to the "off" positions in which they are shown in the drawings.

The above-described attachment has its handle 12 located generally parallel to and relatively near to the shoe 42 and in relatively closely spaced relationship to the inverted underside of the drill for convenient and well-balanced manipulation of the assemblage of the attachment and the drill. The handle 12 also is positioned close to the forward end of the attachment and is over the center of gravity of the assemblage. The arrangement of the cradle portion on the shoe and the low position of the transmission elements of the attachment with the drill mounted in inverted position with its center of gravity as low as possible imparts ideal weight location and balance to the assemblage of the attachment and drill. Also, the keying and clamping elements of the attachment rigidly hold the drill in the cradle. The provision of the switch mechanism 13 in the handle gives instantaneous control of the power.

Referring now to FIG. 6 of the drawings, the second form of the invention is generally similar to the first form of FIGS. 1 to 5 except that the combined guide shoe and drill cradle 42' is a separately fabricated part which is then attached to the split sections 15a' and 15b' which can still be formed by casting. The separate part 42' can be very light weight and low cost since it can be formed from sheet metal or the like by machine forming operations such as stamping and bending as contrasted to casting. Since the split sections 15a' and 15b' can still be formed by casting their internal surfaces can be readily formed and will be similar to their corresponding parts in the first form of the invention, and they will house similar internal mechanisms for converting rotary motion of the drill spindle into reciprocating motion of the jig saw blade slide 22. Switch means 13 and 100 are located in the handle 12' similar to the first form of the invention.

The central lengthwise extending portion 109 of part 42' is raised slightly above the bottom guide surfaces of the part 42' to define a bottom groove 110 which extends for the full length of part 42'. This groove 110 is for the purpose of permitting the sawdust to pass beneath the part 42' in a rearward direction as it is moved along the work being cut. The raised portion 109 as well as the side flanges 111 provide additional strength and rigidity to the part 42'. The split cast sections 15a' and 15b' are preassembled with their internal mechanisms and then this sub-assembly is connected to the forward end of the part 42' at the flanges 111 by means such as screws to provide a generally U-shaped frame similar to the first form of the invention.

The rear of the part 42' has a generally L-shaped member 112 connected thereto between the flanges 111 by means such as stud 113. The upstanding leg of the member 112 has a lug 114 connected thereto which is adapted to enter the socket 51c formed in the rear of the drill housing as shown in FIG. 2. The stud 113 operates in a (not shown) slot formed in portion 109 beneath the base of member 112. When the lug 114 is positioned in socket 51c the stud 113 is tightened to clamp the drill housing in the cradle.

In the second form of the invention the rip guide 43' also can be formed from sheet metal by machine forming operations such as stamping and bending. The rip guide will enter the frame in aligned slots 115 formed in the flanges of the part 42' and portion 109 and can be set in adjusted position by means such as stud 45'.

While there has been illustrated and described two embodiments of the present invention, various changes and modifications will occur to those skilled in the art, and it is intended in the appended claims to cover all such changes and modifications as fall within the true spirit and scope of the present invention.

What is claimed as new and desired to be secured by Letters Patent of the United States is:

1. In an apparatus including a portable drill provided with a handle and a switch trigger projecting out of said handle, the combination therewith of a tool attachment comprising a frame having guide shoe means and also including means for supporting the housing of said drill, means for rigidly clamping said drill to said frame in a position in which said drill extends longitudinally of said guide shoe means and said handle is directed upwardly, handle means secured rigidly to said frame in a position extending above and along said guide shoe means and said drill, and trigger means carried by said handle means and extending from the forward end of said handle means to said switch trigger for actuating said switch trigger.

2. In a jig saw, hollow housing means, a sleeve bearing mounted in the upper end of said housing means, a spherical self-aligning bearing mounted in the lower end of said hollow housing means, a cylindrical slide slidable in said self-aligning bearing and fitting loosely in said sleeve bearing, a piston member secured rigidly to the upper end of said slide and fitting closely in said sleeve bearing to form an air pump therewith, said housing means having a passage extending from the upper end of said sleeve bearing to the exterior of said housing.

3. An attachment for supporting and converting a pistol type portable power drill into a portable power jig saw, said attachment comprising a generally U-shaped frame member, one side of said frame member being elongated and comprising the bottom thereof during use of said attachment, the underside of said bottom having a guide surface formed thereon for moving said frame member along material to be cut, the other side of said frame member being elongated and comprising the top thereof during use of said attachment, said other side comprising an elongated hand grip for said attachment, an elongated cradle provided immediately on the upper surface of said bottom which is adapted to receive a pistol type portable power drill in inverted position, said bottom, guide surface and cradle extending substantially the full length of said power drill, means for releasably locking said power drill in said cradle and with respect to said frame in said inverted position, means on the vertically disposed bight portion of said frame member for supporting a vertically disposed reciprocable jig saw blade, and means on said frame connecting said power drill and blade in drive relationship.

4. In an attachment as in claim 3, wherein said other side extends up to the inside of the handle of said inverted pistol type power drill, and said hand grip having means for controlling the on and off condition of a power motor in said power drill.

5. In an attachment as in claim 3, wherein said frame member is split lengthwise thereof into two complementary U-shaped, cast, half-frame sections which are assembled together, and said blade supporting means and said drive connecting means being housed in said bight portion between said half-frame sections.

6. In an attachment as in claim 3, wherein said frame member is split lengthwise thereof at said other side and bight portion into two complementary cast frame sections which are assembled together, said one side of said frame comprising a fabricated sheet metal member, said assembled together frame sections being connected to said sheet metal member, and said blade supporting means and said drive connecting means being housed in said split bight portion.

7. An attachment for converting a pistol type portable power drill into a portable power jig saw, said attachment comprising a generally U-shaped frame, one side of said frame comprising the bottom and the other side comprising the top of said attachment during use thereof, said bottom having surfaces formed thereon for guiding said attachment along material to be cut and said top comprising a handle for moving said attachment, said bottom and its guiding surfaces extending for substantially the full length of said drill, an elongated cradle formed on the inside of said one side for supporting a pistol type power drill in said frame member in inverted position, said cradle having a bottom and sides which extend substantially the full length of said drill for supporting the inverted normally upper side of said drill, means on the vertically disposed bight portion of said frame for mounting a vertically disposed reciprocable jig saw blade and connecting said blade in drive relationship with said drill, socket means formed on the inside of said one side for receiving the nose portion of said drill, and means for releasably locking said drill in said cradle and the nose portion of said drill in said socket means to fix said drill with respect to said frame.

8. A frame for supporting a pistol type portable power drill in inverted position for converting the same into a portable power jig saw, said frame being generally U-shaped and during use thereof having one of its sides comprising the bottom and the other side comprising the top of said frame, said frame having a drill receiving cradle which extends substantially the full length of a drill and a drill nose receiving portion for mounting a drill inside said frame in inverted position, a guide surface formed on said bottom and extending for substantially the full length of said drill for guiding said frame along material to be cut, said top comprising a handle for moving said frame, and said cradle and nose receiving portion being formed on said bottom, and said cradle being formed close to said guide surface.

9. A frame for supporting a pistol type portable power drill in inverted position, said frame being generally U-shaped and during support of an inverted drill therein having one of its sides comprising the bottom and the other side comprising the top of said frame, said frame having a drill receiving cradle formed in said one side which extends substantially the full length of a drill which is to be supported in said frame, means for releasably locking a drill in said cradle in inverted position, said other side extending in spaced relationship for a substantial length of said drill and comprising a handle for said frame, and a guide surface formed on the underside of said bottom for slidably moving said frame along work material, said guide surface extending for substantially the full length of said drill, and said cradle being formed close to said guide surface.

10. An attachment for converting an inverted pistol type portable power drill into a portable power jig saw, said attachment comprising a frame member which has a horizontally disposed base portion which has a guide surface formed on the bottom side thereof for moving said frame member along material to be cut, the upper side of said base portion having a cradle formed thereon which is generally coextensive with the length of said drill for seating said drill on said frame member in inverted position, the forward end of said base portion which corresponds to the front end of said cradle seated drill having a socket connected thereto for receiving said front end, means for releasably locking said front end in said socket and said seated drill in said cradle, a vertically disposed reciprocable slide mounted on said frame member in front of said socket, a jig saw blade releasably mounted in said slide, and a crank journalled in said socket and a connecting rod interconnecting said crank and slide for converting rotary motion of the spindle of said drill into reciprocating movement of said slide, and said frame member having a generally U-shape and being turned over on one of its sides whereby said one side comprises said base portion, said one side comprising a fabricated sheet metal member, and said sheet metal member having a lengthwise extending groove formed therein for passing sawdust from said blade rearwardly beneath said base portion as said guide surface is moved along work being cut, and the other side of said generally U-shaped frame member comprising a handle for said attachment, and said groove being formed between two spaced portions of said guide surface formed on the undersurface of said sheet metal member along opposite sides of said groove.

11. An attachment for converting an inverted pistol type portable power drill into a portable power jig saw, said attachment comprising a generally U-shaped frame which is turned over on one of its sides, said one side comprising a single piece sheet metal member which has an elongated cradle integrally formed thereon for supporting said drill and guides integrally formed thereon for moving the frame along work being cut, said sheet metal member and its cradle and guides extending for substantially the full length of said drill, the other side of said frame comprising a frame handle, said other side and the bight portion of said frame comprising two hollow cast sections for housing a switch and rotary-to-reciprocatory motion conversion means respectively, and said hollow cast sections being assembled together and connected to said sheet metal member.

12. An attachment for supporting and converting a pistol type portable power drill into a portable power jig saw, said attachment comprising a generally U-shaped frame member, one side of said frame member comprising the bottom thereof during use of said attachment, said bottom having a guide surface formed thereon for moving said frame along material to be cut, the other side of said frame member comprising the top thereof during use of said attachment, said other side comprising a hand grip for said attachment, a cradle provided on the inside of said one side which is adapted to receive a pistol type portable power drill in inverted position, said bottom, guide surface and cradle extending substantially the full length of said power drill, means for releasably locking said power drill in said cradle and with respect to said frame in said inverted position, means on the vertically disposed bight portion of said frame member for supporting a vertically disposed reciprocable jig saw blade, means on said frame connecting said power drill and blade in driving relationship, said other side extending towards the inside of the handle of said inverted pistol type power drill, said hand grip having means for controlling the on and off condition of a power motor in said power drill, and said other side of said frame member being split lengthwise thereof into two complementary frame sections, said complementary frame sections being hollow, and said means for controlling the on and off condition of said power motor being mounted inside said hollow hand grip and being operatively connected to an on and off drill control trigger which is located on the inside of the handle of said inverted pistol type power drill.

13. An attachment for converting an inverted pistol type portable power drill into a portable power jig saw, said attachment comprising a frame member which has a horizontally disposed base portion which has a guide surface formed on the bottom side thereof for moving said frame member along material to be cut, the upper side of said base portion having a cradle formed thereon which is generally coextensive with the length of said drill for seating said drill on said frame member in inverted position, the forward end of said base portion which corresponds to the front end of said cradle seated drill having a socket connected thereto for receiving said front end, means for releasably locking said front end in said socket and said seated drill in said cradle, a vertically disposed reciprocable slide mounted on said frame member in front of said socket, a jig saw blade releasably mounted in said slide, a crank journalled in said socket and a connecting rod interconnecting said crank and slide for converting rotary motion of the spindle of said drill into reciprocating movement of said slide, and said frame member being generally U-shaped and being turned over on one of its sides whereby said one side comprises said base portion, said U-shaped frame member being lengthwise split into two complementary U-shaped halves, integral portions of said complementary halves together defining said socket, the vertically disposed bight portion of said U-shaped frame member being hollow and having said vertically disposed reciprocable slide mounted interiorly thereof, and the other side of said U-shaped frame member comprising a handle for said attachment, said other side extending rearwardly from said vertically disposed bight portion toward the handle of said inverted pistol type drill.

14. In an attachment as in claim 13, wherein integral portions of said complementary halves together define a cylinder chamber in said hollow vertically disposed bight portion, a piston connected to said vertically disposed reciprocable slide which is operable inside said cylinder chamber for compressing air therein, and means for exhausting air compressed in said cylinder chamber by said piston to material which is being cut by said jig saw blade.

15. In an attachment as in claim 13, wherein said attachment handle is hollow, and trigger operated means mounted interiorly of said hollow handle which is operatively connected with a handle switch trigger of said drill for operating said jig saw blade to on and off condition.

References Cited in the file of this patent

UNITED STATES PATENTS

| | | |
|---|---|---|
| Re. 19,501 | Combs | Mar. 19, 1935 |
| 1,852,193 | Schneider | Apr. 5, 1932 |
| 2,015,535 | Sacrey | Sept. 24, 1935 |
| 2,746,493 | Babcock | May 22, 1956 |
| 2,794,463 | Ford et al. | June 4, 1957 |
| 2,822,005 | Lee et al. | Feb. 4, 1958 |
| 2,902,067 | Oakley | Sept. 1, 1959 |
| 2,905,213 | Levine | Sept. 22, 1959 |
| 2,946,358 | Bruck | July 26, 1960 |